United States Patent
Tu et al.

(10) Patent No.: US 10,802,126 B2
(45) Date of Patent: Oct. 13, 2020

(54) ELECTRONIC DEVICE AND POSITIONING METHOD

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW); Wen-Cheng Hsu, New Taipei (TW); Hsing-Chu Wu, New Taipei (TW)

(73) Assignee: Acer Incorporated, New Taipei (TW)

( * ) Notice: Subject to any disclaimer, the term of this patent is extended or adjusted under 35 U.S.C. 154(b) by 351 days.

(21) Appl. No.: 15/984,427

(22) Filed: May 21, 2018

(65) Prior Publication Data

US 2019/0250260 A1    Aug. 15, 2019

(30) Foreign Application Priority Data

Feb. 9, 2018  (TW) .............................. 107104802 A

(51) Int. Cl.
  *G01S 11/14*   (2006.01)
  *G01S 5/30*    (2006.01)
  *G06K 9/00*    (2006.01)

(52) U.S. Cl.
  CPC .................. *G01S 11/14* (2013.01); *G01S 5/30* (2013.01); *G06K 9/00664* (2013.01)

(58) Field of Classification Search
  CPC ........ G01S 11/14; G01S 5/30; G06K 9/00664
  See application file for complete search history.

(56) References Cited

U.S. PATENT DOCUMENTS

| 2006/0095207 | A1* | 5/2006 | Reid | ................ | G06K 9/00664 |
| | | | | | 701/301 |
| 2016/0377712 | A1 | 12/2016 | Wu et al. | | |
| 2019/0033438 | A1* | 1/2019 | Tu | ............................. | G01S 5/30 |
| 2019/0250260 | A1* | 8/2019 | Tu | ............................. | G01S 5/30 |

FOREIGN PATENT DOCUMENTS

| CN | 103217682 | 7/2013 |
| TW | 201022700 | 6/2010 |

* cited by examiner

*Primary Examiner* — Daniel Pihulic
(74) *Attorney, Agent, or Firm* — JCIPRNET

(57) ABSTRACT

An electronic device including a sound receiver and a processor is provided. The sound receiver receives a sound signal provided by a sound generator. When the processor determines that an obstacle is blocked between the electronic device and the fixed device, the processor estimates a virtual position of the electronic device at a current time according to previous movement information and a previous position of the electronic device. The virtual position has a shortest path between a boundary position of the obstacle and the sound generator. The processor obtains a first relative distance between the electronic device and the boundary position according to the sound signal received by the sound receiver and the boundary position. The processor calculates a relative velocity and a relative acceleration of the electronic device relative to the fixed device at the current time according to the sound signal and the first relative distance.

10 Claims, 4 Drawing Sheets

ELECTRONIC DEVICE AND POSITIONING METHOD

CROSS-REFERENCE TO RELATED APPLICATION

This application claims the priority benefit of Taiwan application serial no. 107104802, filed on Feb. 9, 2018. The entirety of the above-mentioned patent application is hereby incorporated by reference herein and made a part of this specification.

BACKGROUND OF THE INVENTION

1. Field of the Invention

The invention relates to a positioning technology, and more particularly, relates to an electronic device and a positioning method.

2. Description of Related Art

In the filed of the positioning technology, an image positioning method using general optical techniques and a sound positioning method using general acoustic techniques have been widely applied in relevant application and operation for various existing portable electronic devices. For example, in the virtual reality application, the user needs to carry a virtual reality device around in a specific space so virtual reality operations can be performed. Also, the virtual reality device needs to obtain positioning information relative to a remote fixed host in order to cooperate with operations in the virtual reality application. However, under normal circumstance, when an obstacle (or shelter) is blocked between the virtual reality device and the remote fixed device, a position of the remote fixed device being blocked cannot be effectively determined if the virtual reality device only uses the image positioning method. If the virtual reality device only uses the sound positioning method, determination errors may occur on the positioning due to changes in a transmission path of a sound signal. Therefore, the correct positioning information cannot be effectively obtained by using only the image positioning method or only the sound positioning method. In view of the above, several solutions are provided in the following embodiments.

SUMMARY OF THE INVENTION

The invention is directed to an electronic device and a positioning method capable of effectively obtaining a relative distance between the electronic device and a fixed device, and accurately determining a relative velocity and a relative acceleration of the electronic device relative to the fixed device.

The electronic device of the invention includes a sound receiver and a processor. The sound receiver is configured to receive a sound signal provided by a sound generator disposed on a fixed device. The processor is coupled to the sound receiver. When the processor determines that an obstacle is blocked between the electronic device and the fixed device according to an image, the processor estimates a virtual position of the electronic device at a current time according to previous movement information and a previous position of the electronic device. The virtual position has a shortest path between a boundary position of the obstacle and the sound generator. The processor obtains a first relative distance between the electronic device and the boundary position according to the sound signal received by the sound receiver and the boundary position. The processor calculates a relative velocity and a relative acceleration of the electronic device relative to the fixed device at the current time according to the sound signal and the first relative distance.

The positioning method of the invention is adapted to an electronic device. The positioning method includes the following steps. A sound signal provided by a sound generator disposed on a fixed device is received by a sound receiver of the electronic device. When determining that an obstacle is blocked between the electronic device and the fixed device according to an image, a virtual position of the electronic device at a current time is estimated according to previous movement information and a previous position of the electronic device. Here, the virtual position has a shortest path between a boundary position of the obstacle and the sound generator. A first relative distance between the electronic device and the boundary position is obtained according to the sound signal received by the sound receiver and the boundary position. A relative velocity and a relative acceleration of the electronic device relative to the fixed device at the current time are calculated according to the sound signal and the first relative distance.

Based on the above, the electronic device and the positioning method of the invention can analyze the image to determine whether the obstacle is blocked between the electronic device and the fixed device. Also, when the obstacle is blocked between the electronic device and the fixed device, the electronic device and the positioning method of the invention can effectively obtain the relative velocity and the relative acceleration of the electronic device relative to the fixed device by analyzing the sound signal.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
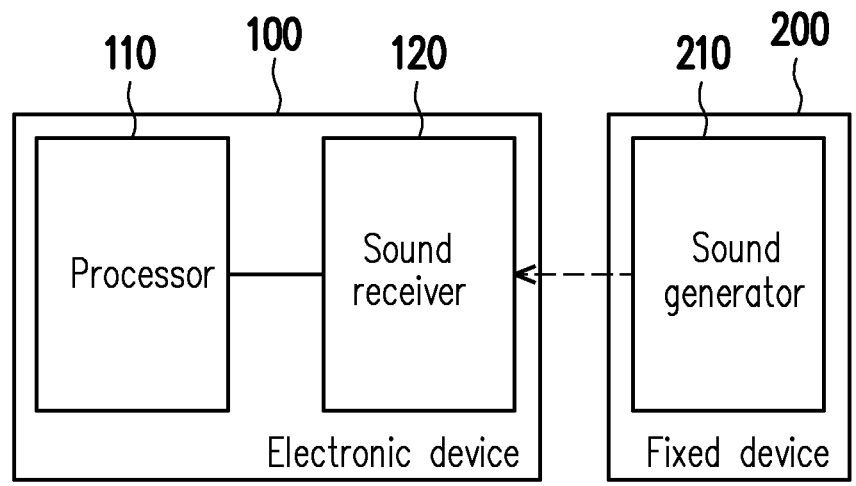
FIG. 1 illustrates a block diagram of an electronic device and a fixed device in an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In order to make content of the disclosure more comprehensible, embodiments are provided below to describe the disclosure in detail, however, the disclosure is not limited to the provided embodiments, and the provided embodiments can be suitably combined. Moreover, elements/components/steps with same reference numerals represent same or similar parts in the drawings and embodiments.

FIG. 1 illustrates a block diagram of an electronic device and a fixed device in an embodiment of the invention. With reference to FIG. 1, an electronic device 100 includes a processor 110 and a sound receiver 120. The processor 110 is coupled to the sound receiver 120. A fixed device 200 includes a sound generator 210. In this embodiment, the sound receiver 120 is configured to receive a sound signal provided by the sound generator 210 disposed on the fixed device 200. The processor 110 may determine a relative distance, a relative velocity and a relative acceleration of the electronic device 100 relative to the fixed device 200 by analyzing the sound signal. In this embodiment, the processor 110 may calculate the relative distance by analyzing the sound signal provided by the sound generator 210 using Time Of Flight, (TOF), Time Difference Of Flight (TDOF) Time Of Arrival (TOA) or Time Difference Of Arrival (TDOA) methods. In this embodiment, the processor 110 may calculate the relative velocity and the relative acceleration of the electronic device 100 relative to the fixed device 200 by analyzing the sound signal provided by the sound generator 210 according to Doppler effect.

In this embodiment, the electronic device 100 may be, for example, portable devices or mobile devices such as a virtual reality (VR) display device, a mobile device, a smart watch, which are not particularly limited by the invention. In this embodiment, the processor 110 may be, for example, a central processing unit (CPU), a microprocessor, a digital signal processor (DSP), a programmable controller, an application specific integrated circuit (ASIC), a system on chip (SoC) or other similar elements or a combination of above-mentioned elements. The processor 110 can execute analysis and calculation functions described in each embodiment of the invention, and can be coupled to a memory to record related parameters and information. In an embodiment, the electronic device 100 and the fixed device 200 belong to a virtual reality system where the fixed device 200 is a remote host, for example. The fixed device 200 may exchange data with the electronic device 100, and the electronic device 100 can be positioned with reference to a position of the fixed device 200.

Figure 2:
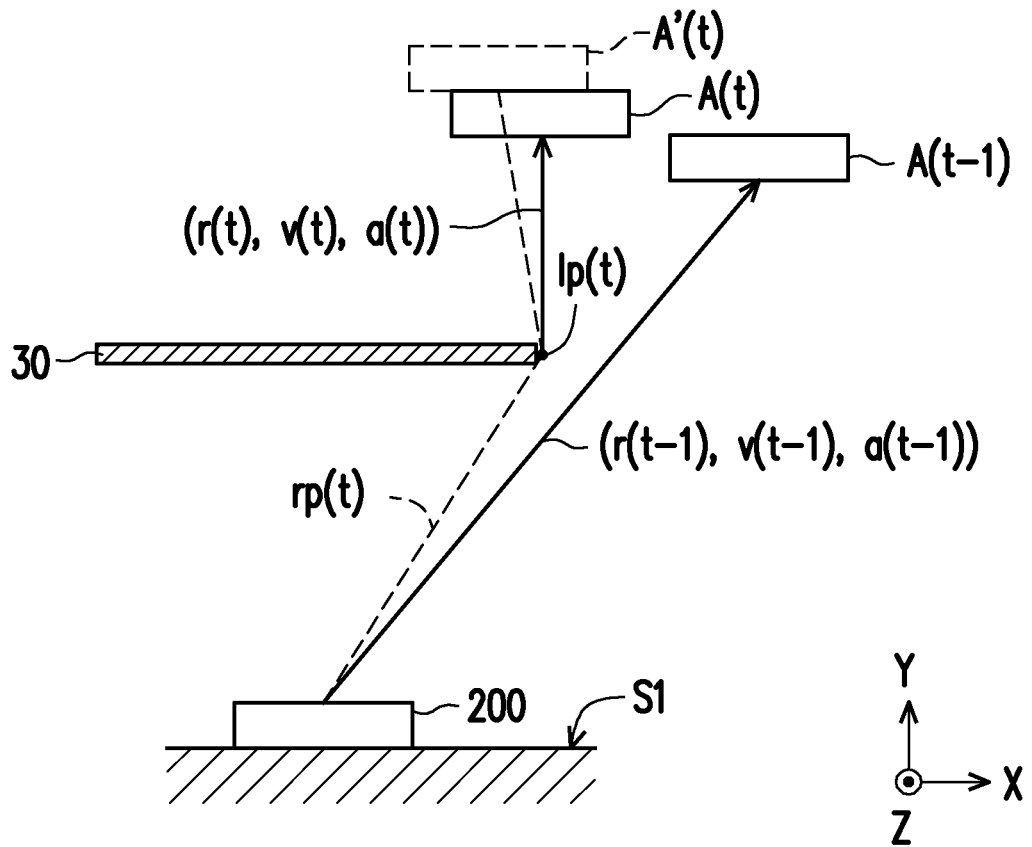
FIG. 2 is a schematic diagram illustrating a scenario using the electronic device and the fixed device in an embodiment of the invention.

FIG. 2 is a schematic diagram illustrating a scenario using the electronic device and the fixed device in an embodiment of the invention. With reference to FIG. 1 and FIG. 2, the electronic device 100, the fixed device 200 and an obstacle (or shelter) 30 are located within the same space. The fixed device 200 is, for example, disposed on a wall surface SI formed by X-coordinate axis and Z-coordinate axis, and the electronic device 100 may move freely in X-coordinate axis, Y-coordinate axis and Z-coordinate axis directions. In this embodiment, the electronic device 100 is located on a position A(t−1) at a previous time (t−1), and the obstacle 30 is not blocked between the sound receiver 120 of the electronic device 100 and the sound generator 210 of the fixed device 200. The symbol "t" refers to a time parameter in seconds (sec). In this embodiment, the processor 110 of the electronic device 100 may analyze the sound signal provided by the sound generator 210, so as to determine a relative distance (r(t−1)), a relative velocity (v(t−1)) and a relative acceleration (a(t−1)) of the electronic device 100 relative to the fixed device 200 at the previous time (t−1).

In this embodiment, according to the sound signal provided by the sound generator 210 and a boundary position $I_P(t)$ of the obstacle 30, the processor 110 obtains a first relative distance (r(t)) between the sound receiver 120 and the boundary position $I_P(t)$ at a current time (t). It should be noted that, in this embodiment, the fixed device 200 may be further disposed with a camera. The camera is configured to capture an image of the electronic device 100 and the surrounding environment and transmit the image to the processor 110 of the electronic device 100, but the invention is not limited thereto. In an embodiment, the camera may also be disposed on the electronic device 100. The camera is configured to capture an image of the fixed device 200 and the surrounding environment, and transmit the image to the processor 110.

In this embodiment, the processor 110 determines whether the obstacle 30 is blocked between the sound receiver 120 and the sound generator 210 according to the image. When the processor 110 determines that the obstacle 30 is blocked between the sound receiver 120 and the sound generator 210, the processor 110 estimates a virtual position A'(t) of the electronic device 100 at the current time (t) according to previous movement information and a previous position of the electronic device 100 at the previous time (t−1). In this embodiment, the previous movement information refers to the previous position, the previous relative distance (r(t−1)), the previous relative velocity (v(t−1)) and the previous relative acceleration (a(t−1)) relative to the fixed device 200 when the electronic device 100 is located on the position A(t−1) at the previous time (t−1). In other words, at the current time (t), because of the obstacle 30, the processor 110 is unable to accurately determine the position of the electronic device 100 at the current time (t). Therefore, a possible position of the electronic device 100 at the current time (t) is estimated according to the previous movement information and the previous position at the previous time (t−1) and represented by the virtual position A'(t).

In this embodiment, the processor 110 first analyzes the image to determine shape and appearance of the obstacle 30 and define coordinates for each point on a boundary of the obstacle 30. In this embodiment, the processor 110 determines the boundary position $I_P(t)$ of the obstacle 30. Here, the virtual position A'(t) has a shortest path between the boundary position $I_P(t)$ of the obstacle 30 and the sound generator 210. Next, the processor 110 analyzes the sound signal to determine a second relative distance ($r_P(t)+r(t)$) between the sound generator 210 and the sound receiver 120. In this embodiment, since the second relative distance ($r_P(t)+r(t)$) is not a straight line, the processor 110 uses the boundary position $I_P(t)$ as a virtual sound source. The processor 110 performs a virtual sound source correction on the second relative distance ($r_P(t)+r(t)$), so as to subtract a third relative distance ($r_P(t)$) between the sound generator 210 and the boundary position $I_P(t)$ from the second relative distance ($r_P(t)+r(t)$) to obtain the first relative distance (r(t)). Lastly, the processor 110 calculates a relative velocity and a relative acceleration of the electronic device 100 at the position A(t) according to the sound signal provided by the sound generator 210 and the first relative distance (r(t)).

Nonetheless, in an embodiment, the electronic device 100 may further includes at least another sound receiver, and the processor 110 may obtain at least another first relative distance between the at least another sound receiver and the boundary position $I_P(t)$. The processor 110 calculates at least another relative velocity and at least another relative acceleration according to the sound signal and the at least another first relative distance. In other words, because these sound receivers may be disposed on different positions (having different coordinates) on the electronic device 100, the processor 110 may perform a triangle conversion on the first relative distances, the relative velocities and the relative accelerations to obtain a current position A(t) of the electronic device 100.

In other words, even if the obstacle 30 is blocked between the electronic device 100 and the fixed device 200, the electronic device 100 of this embodiment can still effectively obtain position information of the electronic device 100 and can accurately determine the relative velocity and the relative acceleration of the electronic device 100 relative to the fixed device 200 at the current time. It should be noted that, whether the position A(t−1), the position A(t), the virtual position A'(t) and the boundary position $I_P(t)$ are represented by one dimensional, two dimensional or three-dimensional coordinate parameters may be determined according to the number of the sound receivers.

Figure 3:
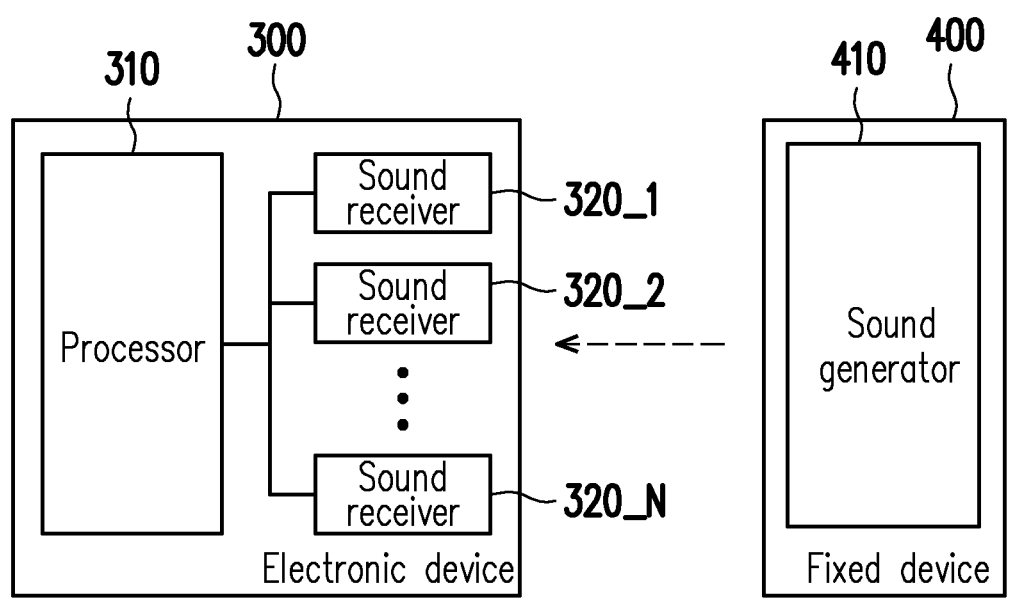
FIG. 3 illustrates a block diagram of an electronic device and a fixed device in another embodiment of the invention.
Figure 4:
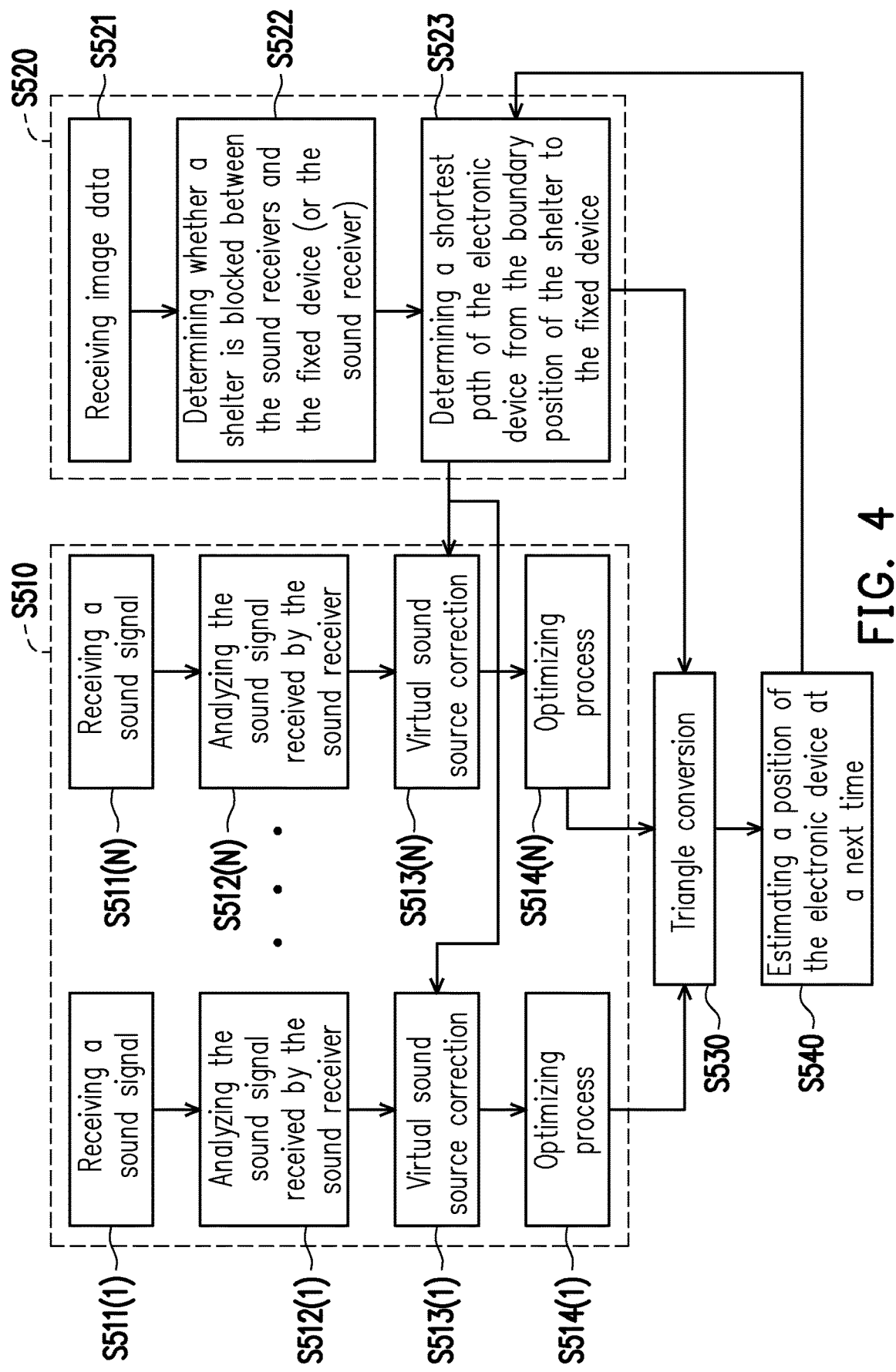
FIG. 4 illustrates a flowchart of a positioning method in an embodiment of the invention.

FIG. 3 illustrates a block diagram of an electronic device and a fixed device in another embodiment of the invention. FIG. 4 illustrates a flowchart of a positioning method in an embodiment of the invention. With reference to FIG. 3 and FIG. 4, a positioning method of FIG. 4 is adapted to an electronic device 300 and a fixed device 400 of FIG. 3. In this embodiment, the electronic device 300 includes a processor 310, a plurality of sound receivers 320_1, 320_2 to 320_N, where N is a positive integer greater than 1. The fixed device 400 includes a sound generator 410. In this embodiment, the sound receivers 320_1, 320_2 to 320_N are disposed at different positions on a device body of the electronic device 300, and the sound receivers 320_1, 320_2 to 320_N receive a sound signal sent by the sound generator 410 of the fixed device 400. In this embodiment, the processor 310 analyzes a signal reception condition for each of the sound receivers 320_1, 320_2 to 320_N to obtain a plurality of relative distances, a plurality of relative velocities and a plurality of relative accelerations.

In step S510, the processor 310 performs an analysis for each of the sound signals received by the sound receivers 320_1, 320_2 to 320_N to obtain the relative distances, the relative velocities and the relative accelerations of the sound receivers 3201, 3202 to 320_N relative to the fixed device 400. In detail, in step S511(1), the sound receiver 320_1 receives the sound signal sent by the sound generator 410. In step S512(1), the processor 310 analyzes the sound signal received by the sound receiver 320_1, and calculates the relative distance, the relative velocity and the relative acceleration between the sound receiver 320_1 and the fixed device 400 (or the sound generator 410). In step S513(1), the procedure 310 performs a virtual sound source correction on the relative distance corresponding to the sound receiver 320_1 (as similar to the correction on the second relative distance ($r_P(t)+r(t)$) described in the embodiment of FIG. 2). In step S514(1), the processor 310 may further perform an adaptive filter operation on the corrected relative distance, the relative velocity and the relative acceleration corresponding to the sound receiver 320_1 to optimize the corrected relative distance, the relative velocity and the relative acceleration corresponding to the sound receiver 320_1.

In this embodiment, steps S511(N) to S514(N) are similar to said steps S511(1) to S514(1), respectively. In steps S511(N) to S514(N), the processor 310 analyzes the sound signal received by the sound receiver 320_N and sent by the sound generator 410, and calculates the relative distance, the relative velocity and the relative acceleration between the sound receiver 320_N and the fixed device 400 (or the sound generator 410). Also, the processor 310 performs the virtual sound source correction on the relative distance related to the sound receiver 320_N, and performs the adaptive filter operation on the corrected relative distance, the relative velocity and the relative acceleration related to the sound receiver 320_N.

It should be noted that, because the sound receivers 320_1, 320_2 to 320_N are disposed at different positions on the device body of the electronic device 300, the sound receivers 320_1, 320_2 to 320_N have different coordinates. Accordingly, there will be differences among the relative distances, the relative velocities and the relative accelerations corresponding to the sound receivers 320_1, 320_2 to 320_N. Therefore, in step S530, the processor 310 may perform a triangle conversion on the first relative distances, the relative velocities and the relative accelerations corresponding to the sound receivers 320_1, 320_2 to 320_N to calculate coordinate information of the electronic device 300 at a current position.

Furthermore, in step S520, the processor 310 analyzes an image, and defines coordinate information of a position of a virtual sound source. In this embodiment, step S510 and step S520 are executed simultaneously, but the invention is not limited thereto. Specifically, in step S521, the processor 310 receives image data. In step S522, the processor 310 determines whether an obstacle (or shelter) is blocked between the sound receivers 320_1, 320_2 to 320_N and the fixed device 400 (or the sound generator 410). If the obstacle is blocked between the sound receivers 320_1, 320_2 to 320_N and the fixed device 400, the processor 310 execute the step S523. On the contrary, if there is no obstacle located between the sound receivers 320_1, 320_2 to 320_N and the fixed device 400, the processor 310 stops to execute the step S520. The processor 310 continues to execute the step S510. In step S523, when the processor 310 determines that there is one obstacle blocked between the sound receivers 320_1, 320_2 to 320_N and the fixed device 400 (or the sound generator 410), the processor 310 determines a shortest path of the electronic device 300 from the boundary position of the obstacle to the fixed device 400, so as to determine the coordinate information of the virtual sound source at the boundary position of the obstacle. Next, the processor 310 corrects the relative distances according to the coordinate information of the virtual sound source (step S514(1) to step S514(N)).

In step S530, the processor 310 integrates and performs the triangle conversion on the corrected relative distances, the relative velocities and the relative accelerations of the sound receivers 320_1, 320_2 to 320_N to obtain the coordinate information of the electronic device 300 at the current time. Also, in step S540, the processor 310 may estimate the position of the electronic device 300 at a next time according to the coordinate information of the current position, the relative velocity and the relative acceleration. Accordingly, when the obstacle is blocked between the electronic device 300 and the fixed device 400, the electronic device 300 and the positioning method of this embodiment can still effectively obtain the relative distance, the relative velocity and the relative acceleration of the electronic device 300 relative to the fixed device, and can accurately determine the coordinate information of the current position of the electronic device 300.

In addition, enough teaching, suggestion, and implementation regarding other device features and technical details of the electronic device 300 of this embodiment may be obtained from the foregoing embodiments of FIG. 1 and FIG. 2, and thus related descriptions thereof are not repeated hereinafter.

Figure 5:
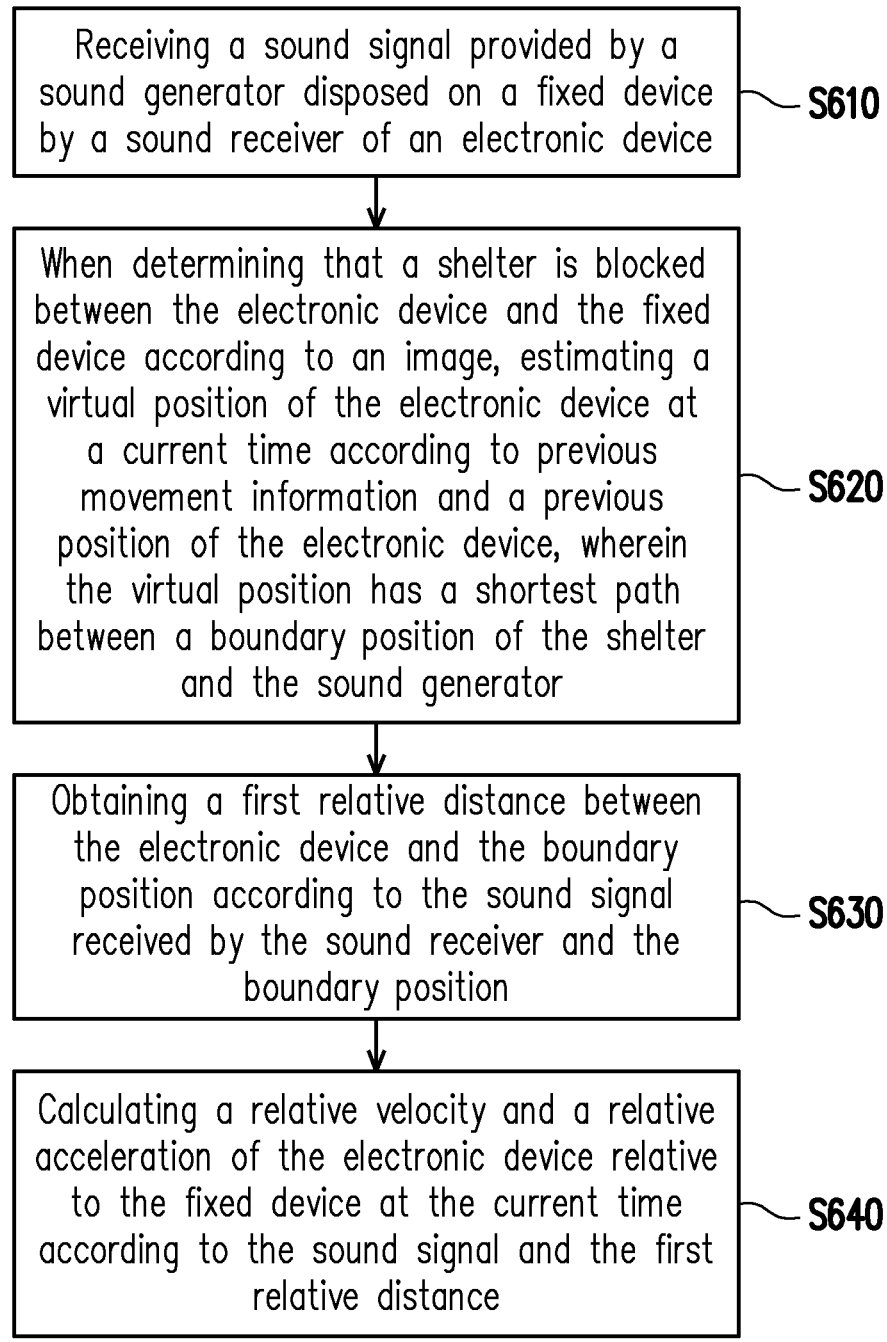
FIG. 5 illustrates a flowchart of a positioning method in another embodiment of the invention.

FIG. 5 illustrates a flowchart of a positioning method in another embodiment of the invention. With reference to FIG. 1 and FIG. 5, this embodiment is adapted to the electronic device 100 of FIG. 1. In step S610, the processor 110 receives a sound signal provided by the sound generator 210 disposed on the fixed device 200 by the sound receiver 120 of the electronic device 100. In step S620, when determining that an obstacle (or shelter) is blocked between the electronic device 100 and the fixed device 200 according to an image, the processor 110 estimates a virtual position of the electronic device 100 at a current time according to previous movement information and a previous' position of the electronic device 100. Here, the virtual position has a shortest path between a boundary position of the obstacle and the sound generator. In step S630, the processor 110 obtains a first relative distance between the electronic device 100 and the boundary position according to the sound signal received by the sound receiver 120 and the boundary position. In step S640, the processor 110 calculates a relative velocity and a relative acceleration of the electronic device 100 relative to the fixed device 200 at the current time according to the sound signal and the first relative distance. In this way, the positioning method of this embodiment may effectively obtain the relative distance between the electronic device 100 and the fixed device 200, and may accurately determine the relative velocity and the relative acceleration of the electronic device 100 relative to the fixed device 200.

In addition, enough teaching, suggestion, and implementation regarding other device features and technical details of the electronic device 100 of this embodiment may be obtained from the foregoing embodiments of FIG. 1 to FIG. 4, and thus related descriptions thereof are not repeated hereinafter.

In summary, the electronic device and the positioning method of the invention are capable of determining whether the obstacle exists between the electronic device and the fixed device by analyzing the image content. When the obstacle is blocked between the electronic device and the fixed device, the electronic device and the positioning method of the invention may effectively correct the relative distance, the relative velocity and the relative acceleration between the electronic device and the fixed device. Also, the electronic device and the positioning method of the invention may integrate sound reception results from multiple sound receivers of the electronic device to obtain the position information through the triangle conversion.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. An electronic device, comprising:
a sound receiver, configured to receive a sound signal provided by a sound generator disposed on a fixed device;
a processor, coupled to the sound receiver, the processor estimating a virtual position of the electronic device at a current time according to previous movement information and a previous position of the electronic device when the processor determines that an obstacle is blocked between the electronic device and the fixed device according to an image, wherein the virtual position has a shortest path between a boundary position of the obstacle and the fixed device, the processor obtains a first relative distance between the electronic device and the boundary position according to the sound signal received by the sound receiver and the boundary position, and the processor calculates a relative velocity and a relative acceleration of the electronic device relative to the fixed device at the current time according to the sound signal and the first relative distance.

2. The electronic device according to claim 1, wherein the processor uses the boundary position as a virtual sound source, and the processor analyzes the sound signal to determine a second relative distance between the fixed device and the electronic device, and subtracts a third relative distance between the fixed device and the boundary position from the second relative distance to obtain the first relative distance.

3. The electronic device according to claim 1, wherein the processor performs an adaptive filter operation on the first relative distance, the relative velocity and the relative acceleration of the sound receiver to optimize the first relative distance, the relative velocity and the relative acceleration.

4. The electronic device according to claim 1, further comprising:
another sound receiver, coupled to the processor,
wherein the processor obtains another first relative distance between the electronic device and the boundary position according to the sound signal received by the another sound receiver and the boundary position, and the processor calculates another relative velocity and another relative acceleration of the electronic device relative to the fixed device at the current time according to the sound signal and the another first relative distance,
wherein the processor performs a triangle conversion on the first relative distances, the relative velocities and the relative accelerations to calculate a current position of the electronic device.

5. The electronic device according to claim 1, wherein a camera is disposed on the electronic device or the fixed device, and the camera is configured to capture the image and provide the image to the processor.

6. A positioning method, adapted to an electronic device, and comprising:
receiving a sound signal provided by a sound generator disposed on a fixed device by a sound receiver of the electronic device;
estimating a virtual position of the electronic device at a current time according to previous movement information and a previous position of the electronic device when determining that an obstacle is blocked between the electronic device and the fixed device according to an image, wherein the virtual position has a shortest path between a boundary position of the obstacle and the fixed device;
obtaining a first relative distance between the electronic device and the boundary position according to the sound signal received by the sound receiver and the boundary position; and
calculating a relative velocity and a relative acceleration of the electronic device relative to the fixed device at the current time according to the sound signal and the first relative distance.

7. The positioning method according to claim 6, wherein the electronic device uses the boundary position as a virtual sound source, and the step of obtaining the first relative distance between the electronic device and the boundary position according to the sound signal received by the sound receiver and the boundary position comprises:

analyzing the sound signal to determine a second relative distance between the fixed device and the electronic device; and subtracting a third relative distance between the fixed device and the boundary position from the second relative distance to obtain the first relative distance.

8. The positioning method according to claim 6, further comprising:

performing an adaptive filter operation on the first relative distance, the relative velocity and the relative acceleration of the sound receiver to optimize the first relative distance, the relative velocity and the relative acceleration.

9. The positioning method according to claim 6, further comprising:

obtaining another first relative distance between the electronic device and the boundary position according to the sound signal received by another sound receiver and the boundary position;

calculating another relative velocity and another relative acceleration of the electronic device relative to the fixed device at the current time according to the sound signal and the another first relative distance; and performing a triangle conversion on the first relative distances, the relative velocities and the relative accelerations to calculate a current position of the electronic device.

10. The positioning method according to claim 6, wherein a camera is disposed on the electronic device or the fixed device, and the camera is configured to capture the image and provide the image to the processor.

* * * * *